United States Patent
Peiffer et al.

(10) Patent No.: US 6,852,387 B2
(45) Date of Patent: Feb. 8, 2005

(54) ONE-SIDED MAT, SEALABLE, BIAXIALLY ORIENTED POLYESTER FILM

(75) Inventors: Herbert Peiffer, Mainz (DE); Stefan Bartsch, Wiesbaden (DE); Gottfried Hilkert, Saulheim (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 0 days.

(21) Appl. No.: 10/022,143

(22) Filed: Dec. 13, 2001

(65) Prior Publication Data

US 2002/0114944 A1 Aug. 22, 2002

(30) Foreign Application Priority Data

Dec. 20, 2000 (DE) .......................... 100 63 590

(51) Int. Cl.⁷ .......................... B32B 27/08; B32B 27/18; B32B 27/20; B32B 27/36; B32B 31/30

(52) U.S. Cl. .................. 428/141; 428/213; 428/215; 428/216; 428/323; 428/346; 428/347; 428/349; 428/354; 428/480; 428/910; 264/288.4; 264/290.2

(58) Field of Search .................. 428/141, 213, 428/215, 216, 323, 346, 347, 349, 354, 480, 910; 256/288.4, 290.2; 264/280, 290.2; 528/293, 294

(56) References Cited

U.S. PATENT DOCUMENTS

| | | | |
|---|---|---|---|
| 3,944,699 A | 3/1976 | Mathews et al. | |
| 4,493,872 A * | 1/1985 | Funderburk et al. | 428/332 |
| 4,605,591 A * | 8/1986 | Nose et al. | 428/332 |
| 5,955,181 A * | 9/1999 | Peiffer et al. | 428/212 |
| 6,136,420 A * | 10/2000 | Hibiya et al. | 428/213 |
| 6,214,440 B1 * | 4/2001 | Peiffer et al. | 428/141 |
| 6,423,401 B2 * | 7/2002 | Peiffer et al. | 428/216 |
| 6,709,731 B2 * | 3/2004 | Murschall et al. | 428/141 |
| 2001/0035593 A1 | 11/2001 | Peiffer et al. | |
| 2002/0015835 A1 | 2/2002 | Peiffer et al. | |
| 2003/0054129 A1 * | 3/2003 | Peiffer et al. | 428/97 |
| 2003/0064195 A1 * | 4/2003 | Peiffer et al. | 428/141 |

FOREIGN PATENT DOCUMENTS

| | | |
|---|---|---|
| DE | 23 53 347 | 3/1974 |
| DE | 100 07 722 A1 * | 8/2001 |
| DE | 100 07 723 A1 * | 8/2001 |
| DE | 100 07 725 A1 * | 8/2001 |
| EP | 0 035 835 A1 | 9/1981 |
| EP | 0 144 878 A2 | 6/1985 |
| EP | 0 432 886 A2 | 6/1991 |
| EP | 0 515 096 A2 | 11/1992 |
| EP | 0 849 075 A2 | 6/1998 |
| EP | 0 945 258 A2 | 9/1999 |
| EP | 1 138 480 A2 | 10/2001 |
| GB | 1 465 973 | 3/1977 |
| GB | 2 344 596 A | 6/2000 |
| WO | WO 97/37849 A1 | 10/1997 |
| WO | WO 98/06575 A1 | 2/1998 |
| WO | WO 01/53080 A1 | 7/2001 |
| WO | WO 01/60140 A1 | 8/2001 |
| WO | WO 01/60608 A1 | 8/2001 |
| WO | WO 01/60609 A1 | 8/2001 |
| WO | WO 01/60610 A1 | 8/2001 |
| WO | WO 01/60613 A1 | 8/2001 |

* cited by examiner

*Primary Examiner*—Vivian Chen
(74) *Attorney, Agent, or Firm*—Pro Pat, LLC

(57) ABSTRACT

The invention relates to a one-sided mat, sealable, biaxially oriented polyester film with at least a base layer (B), a sealable cover layer (A) and an additional mat cover layer (C), where the sealable cover layer (A) has a minimum sealing temperature of 120° C. maximum and a seal-seam strength of at least 1.3 N/15 mm film width and where the topographies of the sealable cover layer (A) and the mat shimmering cover layer (C) have certain characteristics. The film according to this invention is suitable for the use as flexible packaging material, especially when used in connection with fast-running packaging machines.

14 Claims, No Drawings

ONE-SIDED MAT, SEALABLE, BIAXIALLY ORIENTED POLYESTER FILM

The invention relates to a one-sided mat, sealable, biaxially oriented polyester film made of at least a base layer (B) and cover layers (A) and (C) applied on both sides of base layer (B). The invention also relates to a process for the production and to the use of this film.

BACKGROUND OF THE INVENTION

Sealable, biaxially oriented polyester films are known in the art.

GB-A 1 465 973 describes a coextruded, double-layered polyester film, one layer of which consists of copolyesters containing isophthalic and terephthalic acid and the other layer of which consists of polyethylene terephthalate. Due to the absence of filler the film cannot reliably be manufactured (the film cannot be wound) and is only limited suitable for further processing.

EP-A-0 035 835 describes a coextruded, sealable polyester film, to the sealing layer of which contains particles with an average particle size exceeding the thickness of the sealing layer in order to improve the winding and processing characteristics. These particulate additives form protrusions at the surface, which prevent any unwanted blocking and sticking of the film to rollers or guides. No further details in terms of the use of antiblocking agents are given about the other, non-sealable layer of the film. It remains unclear whether or not this layer contains any antiblocking agents. No statements about the sealing temperature range are made in the document. Seal seam strength is measured at 140° C. and is within the range from 63 to 120 N/m (corresponding to 0.97 to 1.8 N/15 mm film width).

EP-A-0 432 886 describes a coextruded multi-layered polyester film which has one surface, equipped with a sealable layer, and a second surface, equipped with an acrylate layer. Here too, the sealable cover layer may consist of copolyesters containing isophthalic acid or terephthalic acid. Coating the reverse side improves the processing characteristics. No statements about the sealing temperature range are made in the document. Seal seam strength is measured at 140° C. For a sealing layer with a thickness of 11 μm a seal seam strength of 761.5 N/m (corresponding to 11.4 N/15 mm film width) is specified. The disadvantage of coating the reverse side with an acrylate layer is that this side can no longer seal against the sealable cover layer. Thus the film is only limited useable.

EP-A-0 515 096 describes a coextruded, multi-layered, sealable polyester film which contains an additional additive on the sealable layer. The additive may, as an example, contain inorganic particles and is preferably applied to the film during its production in the form of an aqueous coating. This allows the film to maintain its good sealing properties and provides a good processability. The reverse side contains only very few particles which get into this layer mainly via the regranulate. Even in this document no statements about the sealing temperature range are made. Seal seam strength is measured at 140° C. and is greater than 200 N/m (corresponding to 3 N/15 mm film width). For a sealing layer with a thickness of 3 mm a seal seam strength of 275 N/m is specified.

WO 98/06575 describes a coextruded, multi-layered polyester film containing a sealable cover layer and a non-sealable base layer. The base layer may consist of one or more layers with one of these layers being in contact with the sealable layer. The other (outer) layer then forms the second, non-sealable cover layer. Here too the sealable cover layer may consist of copolyesters containing isophthalic acid and terephthalic acid. However, these copolyesters do not contain any antiblocking particles. Apart from that, the film contains 0.1 to 10% by weight of an UV-absorber which is added to the base layer. The base layer of this film is provided with customary antiblocking agents. The film may also have a mat look. The film has good sealing properties, it does, however, not have the desired processing characteristics and has deficiencies in its optical properties (gloss and opacity).

Also known in the prior art are mat, milky-appearing, biaxially-oriented polyester films.

DE-A 23 53 347 describes a process for the production of a mono or multilayered, milky polyester film, wherein a mixture of particles from a linear polyester with 3 to 27% by weight of a homopolymer or a copolymer made of ethylene or propylene is made, the mixture is extruded to form a film, the film is chilled and biaxially oriented by way of stretching it in orthogonal directions, and wherein the film is heat-set. The disadvantage of this procedure is that the regrind resulting from the production (mainly a mixture of polyester raw material and ethylene or propylene copolymer) can no longer be reused since otherwise the film turns yellow. This makes the process uneconomical and the colored film produced with regrind could not succeed in the market. Increasing the concentration of copolymer in the polyester generally causes the film to lose its milky character and it turns white with a high opacity.

It was the object of the present invention to provide a one-sided mat, sealable, biaxially oriented polyester film without the disadvantages of the previously mentioned films according to the prior art and with outstanding optical properties (high degree of matness with simultaneous good transparency), a very good sealability and an improved processability. Moreover a safe and trouble-free processability even on high-speed processing machines should be guaranteed. During the film production it must additionally be guaranteed that up to 60% by weight of the waste material, based on the total weight of the film, resulting from the film production can be reused for the film production, without having a noticeable adverse effect on the physical and optical properties of the film manufactured in that manner.

SUMMARY OF THE INVENTION

According to the invention this objective has been achieved by providing a one-sided mat, sealable, biaxially-oriented and coextruded polyester film with at least a base layer (B), with a sealable cover layer (A) and with a mat cover layer (C), wherein the film has the following characteristics:

a) the sealable cover layer (A) has a minimum sealing temperature of no more than 120° C., a minimum seal seam strength of 1.0 N/15 mm film width, a maximum $R_a$-value of 100 nm and a surface gas-flow value within the range from 20 to 4000 s;

b) the mat cover layer (C) has a maximum gloss of 100, a minimum $R_a$-value of 150 nm and a gas-flow value at the surface within the range from 0 to 50 s;

c) the opacity is below 50%.

The dependant claims define preferred embodiments of the invention which will be explained in more detail below.

DETAILED DESCRIPTION OF THE INVENTION

According to the invention the film has at least three layers and comprises the base layer (B), the sealable cover layer (A) and the non-sealable cover layer (C).

Base layer B preferably contains a minimum of 90% by weight of thermoplastic polyester. Suitable polyesters are made from ethylene glycol and terephthalic acid (=polyethylene terephthalate, PET), from ethylene glycol and naphthalene-2,6-dicarboxilic acid (=polyethylene-2,6-naphthalate, PEN), from 1,4-bis-hydroxymethyl-cyclohexane and terephthalic acid [=poly(1,4-cyclohexanedimethylene terephthalate), PCDT] as well as from ethylene glycol, naphthalene-2,6-dicarboxilic acid and biphenyl-4,4'-dicarboxilic acid (polyethylene-2,6-naphthalatebibenzoate, PENBB). Special preference is given to polyesters consisting of at least 90 mol %, preferably of at least 95 mol % of ethylene glycol and terephthalic acid units or of ethylene glycol and naphthalene-2,6-dicarboxilic acid units. The remaining monomer units may be selected from other aliphatic, cycloaliphatic or aromatic diols, respectively dicarboxilic acids, which may also be present in cover layer A (or cover layer C).

Other suitable aliphatic diols are, as an example, diethylene glycol, triethylene glycol, aliphatic glycols with the general formula HO—$(CH_2)_n$—OH, with n being an integer from 3 to 6 (propane-1,3-diol, butane-1,4-diol, pentane-1,5-diol and hexane-1,6-diol) or branched aliphatic glycols with up to 6 carbon atoms. Among the group of cycloaliphatic diols, cyclohexane diols (especially cyclohexane-1,4-diol) are worth mentioning. Other suitable aromatic diols, for example, correspond to the formula HO—$C_6H_4$—X—$C_6H_4$—OH, where X represents —$CH_2$—, —$C(CH_3)_2$—, —$C(CF_3)_2$—, —O—, —S— or —$SO_2$—. Along with that, bisphenols of the formula HO—$C_6H_4$—$C_6H_4$—OH are well suited.

Other preferred aromatic dicarboxilic acids are benzene dicarboxilic acids, naphthalene dicarboxilic acids (for example naphthalene-1,4'- or 1,6-dicarboxilic acid), biphenyl-x,x'-dicarboxilic acids (especially biphenyl-4,4'-dicarboxilic acid), diphenylacetylene-x,x'-dicarboxilic acids (especially diphenylacetylene-4,4'-dicarboxilic acid) or stilbene-x,x'-dicarboxilic acids. Among the cycloaliphatic dicarboxilic acids, cyclohexanedicarboxilic acids (especially cyclohexane-1,4-dicarboxilic acid) are worth mentioning. Among the aliphatic dicarboxilic acids, the ($C_3$–$C_{19}$) alkane diacids are especially suitable, wherein the alkane portion can be linear or branched.

The polyesters can be produced, e.g., according to the ester interchange process. This is based on the use of dicarboxilic acid esters and diols, which are reacted with conventional ester interchange catalysts, such as zinc-, calcium-, lithium-, magnesium- and manganese salts. The intermediate products are then polycondensated in the presence of customary polycondensation catalysts, such as antimontrioxide or titanium salts. These may just as well be produced according to the ester interchange process in the presence of polycondensation catalysts, where dicarboxilic acids and diols directly react with each other.

The sealable cover layer (A) which is applied to the base layer (B) by means of coextrusion is based on polyester copolymers and substantially consists of copolyesters which are mainly composed of isophthalic acid and terephthalic acid units and of ethylene glycol units. The remaining monomer units may be selected from other aliphatic, cycloaliphatic or aromatic diols, respectively dicarboxilic acids, which may also be present in the base layer. Preferred copolyesters with the desired sealing properties are those made from ethylene terephthalate and ethylene isophthalate units. The ethylene terephthalate content is 40 to 95 mol % and the respective ethylene terephthalate content is 60 to 5 mol %. Preference is given to copolyesters with an ethylene terephthalate content of 50 to 90 mol % and a respective ethylene terephthalate content of 50 to 10 mol %, and especially preferred are copolyesters with an ethylene terephthalate content of 60 to 85 mol % and a respective ethylene terephthalate content of 40 to 15 mol %.

The desired sealing- and processing properties of the film according to the invention are derived from the combination of the properties of the copolyester used for the sealable cover layer (A) and the surface topographies of both the sealable cover layer (A) and the mat cover layer (C).

The desired minimum sealing temperature of 120° C. and the minimum seal seam strength of 1.0 N/15 mm film width are obtained when the copolymers described above in more detail are used for the sealable cover layer (A). In order to obtain the desired handling and in order to obtain good processing properties the sealable cover layer (A) is further modified.

In an especially preferred embodiment this is achieved by suitable antiblocking agents of a selected size which are added to the sealing layer in a certain quantity and in such a way that blocking of the film is minimized on the one hand, and the sealing properties deteriorate only insignificantly on the other hand.

The antiblocking agents for the sealable cover layer (A) are basically the same as for the mat cover layer (C). Compared to the mat cover layer (C) the amount of antiblocking agents in the sealable cover layer (A) is considerably smaller. In order to obtain the previously mentioned properties the amount of antiblocking agents in the sealable cover layer (A) is from 0.01 to 1% by weight, preferably from 0.015 to 0.08% by weight, and in the especially preferred embodiment from 0.02 to 0.08% by weight. The desired combinations of properties can be obtained especially when the topography of the sealable cover layer (A) is defined by the following parameters:

Roughness of the sealable cover layer, expressed by its $R_a$-value, must be 60 nm or less. Otherwise the sealing properties according to the invention are adversely affected. The surface gas-flow value must be within the range from 20 to 4000 s. Values below 20 s adversely affect the sealing properties according to the invention, whereas values above 4000 s lead to a noticeable deterioration of the handling properties of the film.

In a preferred embodiment the maximum coefficient of friction (COF) of the sealable cover layer (A) against itself is 1.0 and in an especially preferred embodiment not more than 0.8. Handling qualities and processing properties of the film with the especially preferred COF are very good.

In order to obtain the desired matness/degree of matness cover layer (C) contains an effective amount of 0.5 to 20% by weight of particles (also referred to as additives or pigments), based on the total weight of the cover layer (C). The preferred embodiment of the film according to the invention has a particle content of 1.0 to 18% by weight, the especially preferred embodiment has 1.5 to 16% by weight.

Typical particles that have a positive influence on the degree of matness of the film are inorganic and/or organic particles such as calcium carbonate, amorphous silicic acid, talcum, magnesium carbonate, barium carbonate, calcium sulfate, barium sulfate, lithium phosphate, calcium phosphate, magnesium phosphate, aluminum oxide, lithium fluoride, calcium-, barium-, zinc- or manganese salts of the employed dicarboxilic acids, carbon black, titanium dioxide, kaolin or cross-linked polymer particles, for example polystyrol or acrylate particles.

Moreover, mixtures of two or more different particle systems or mixtures of particle systems of the same chemical composition, but of different particle size can be used. These particles may be added to the polymers of the individual layers at suitable concentrations, e.g. in the form of a glycolic dispersion during polycondensation or by way of masterbatches during extrusion.

Preferred particles are $SiO_2$ particles in colloidal and chain-like form. These particles are easily integrated into the polymer matrix. The particle diameter of the particles used is not limited. It has proven useful for the solution of the problem to use particles with an average particle diameter (typically the $d_{50}$-value) of more than 1 μm, preferably within the range from 1.5 to 10 μm and especially preferred from 2 to 8 μm.

Accordingly pigmentation of the individual layers may vary and mainly depends on the structure of the film (layered structure) and the requirements which the film has to meet in terms of further desired optical properties and of the processability during production.

Cover layer (C) in another preferred embodiment contains, apart from polyethylene terephthalate homopolymer or polyethylene terephthalate copolymer, yet an additional polymer component I. This component I is a polyethylene terephthalate-copolymer, which consists of the condensation product of the following monomers, respectively the derivations thereof capable of forming polyesters:

a) 40 to 99 mol-% of isophthalic acid,
b) 0 to 60 mol-% of at least one aliphatic dicarboxilic acid with the formula $HOOC(CH_2)_nCOOH$, with n being within the range from 1 to 11,
c) 1 to 15 mol-% of at least one sulfomonomer containing an alkalimetal sulfonate group attached to the aromatic portion of a dicarboxilic acid,
d) the stoichiometric quantity of a copolymerizable aliphatic or cycloaliphatic glycol required for forming 100 mol-% of condensate, with the percentages each being related to the total quantity of the monomers forming component I. For a detailed description see EP-A-0 144 878 which is incorporated herein by reference.

Component I is added to the mat cover layer suitably as an additional polymer component, the weight portion of which may be up to 60% by weight. In this case component I forms, together with the other polymers present in this layer, a blend or a mixture or even a copolymer through ester interchange reaction during extrusion.

Mixtures according to the present invention are mechanical mixtures made from the individual components. In general, the individual components in the form of pressed molded articles of small size, e.g. as lenticular or spherical granulate, are merged for this purpose and mechanically mixed thereafter using a suitable vibrating machine. Another way of making the mixture is to feed component I as well as the other polymers for cover layer C, each individually, to the extruder for the cover layer and to perform the mixing process in the extruder, respectively in the systems containing the melts thereafter.

A blend according to the present invention is an alloy-like combination of the individual components which can no longer be decomposed into its original components. A blend has the same properties as a homogeneous material and can be characterized accordingly by suitable parameters.

The desired combinations of properties can be achieved especially when the topography of the mat-shimmering cover layer (C) can be defined by the following set of parameters:

a) the roughness of the film, expressed by its $R_a$-value is within the range from 150 to 1000 nm, preferably from 175 to 950 nm and especially preferred from 200 to 900 nm. Values below 150 nm adversely affect the degree of matness of the surface, values in excess of 1000 nm impair the optical properties of the film.
b) The surface gas-flow value is within the range from 0 to 80 s, preferably from 1 to 50 s. Values exceeding 80 s adversely affect the degree of matness of the film.

Base layer (B) may also contain additional common additives such as stabilizers and/or pigments (=fillers). Preferred for the use as stabilizers are, as an example, phosphorous compounds such as phosphoric acid or phosphoric acid ester.

Typical pigments (=fillers) for the base layer are the inorganic and/or organic particles specified for the two cover layers, such as calcium carbonate, amorphous silicic acid, talcum, magnesium carbonate, barium carbonate, calcium sulfate, barium sulfate, lithium phosphate, calcium phosphate, magnesium phosphate, aluminum oxide, LiF, calcium-, barium-, zinc- or manganese salts of the employed dicarboxilic acids, carbon black, titanium dioxide, kaolin or cross-linked polystyrol or acrylate particles.

The preferred embodiment of the film has three layers, base layer (B) and cover layers (A) and (C) applied to both sides of the base layer, with cover layer (A) being sealable against itself and against cover layer (C).

An additional intermediate layer may optionally be present between base layer (B) and cover layers (A) and (C). It may in turn consist of the polymers previously described for base layer B or cover layers (A) and (C). An especially preferred embodiment has an intermediate layer made from the same polyester which is used for the base layer. It may also contain the previously described common additives. The thickness of the intermediate layer is generally greater than 0.3 μm and preferably ranges from 0.5 to 15 μm, especially from 1.0 to 10 μm and especially preferred from 1.0 to 5 μm.

The especially preferred embodiment of the film according to the invention has a thickness of cover layers (A) and (C) which is generally from 0.1 to 5.0 μm, preferably from 0.2 to 4.5 μm, and especially preferred from 0.3 to 4.0 μm, where cover layers (A) and (C) can have the same or different thicknesses.

The total thickness of the polyester film according to the invention may vary within a certain range. It is within the range from 3 to 350 μm, especially from 5 to 250 μm, with base layer B having a portion of preferably 5 to 95% of the total thickness.

During the film production the polymers for base layer (B) and cover layers (A) and (C) are fed to three extruders. Foreign bodies or contaminations, if present, may be eliminated from the polyester melts prior to/during extrusion by suitable filters. The melts are then formed to flat melt films in a flat film die and layered on top of one another. Then the multi-layered film is drawn off on a quenching roll and optionally further rolls and solidified.

The invention also relates to a process for the production of the polyester film according to the invention by the known coextrusion process.

This process comprises coextrusion of the melts corresponding to the individual layers (A), (B) and (C) through a flat film die, drawing off of the resulting film on one or more roller/s for solidification, subsequent biaxial orientation, heat setting of the biaxially-oriented film and optional corona- or flame treating of the surface layer earmarked for treatment.

During coextrusion, the polymer respectively polymer mixtures for the individual layers are compressed and liquefied in an extruder where the polymer, respectively polymer mixture, already contains the optional additives. The melts are then simultaneously extruded through a flat film die (slot die) and the extruded multi-layered melts are drawn off on one or more take-off rollers, where the melts cool off and solidify to form a pre-film.

The biaxial orientation is usually performed sequentially. Preferably the pre-film is initially stretched longitudinally (i.e. in machine direction), and transversely stretched thereafter (i.e. vertically to machine direction). This leads to a spatial orientation of the polymer chains. The longitudinal stretching may be done by two rollers rotating at different speeds depending on the desired stretch ratio. For the transverse stretching process a suitable tenter frame is generally used, wherein the film is attached to both rims and then stretched horizontally at elevated temperatures.

The temperature at which the orientation is performed may vary within a relatively wide range and depends on the desired properties of the film. As a rule, the longitudinal orientation is performed at a temperature ranging from 80 to 130° C. and the transverse orientation within the range from 90 to 150° C. The length stretch ratio is generally within the range from 2.5:1 to 6:1, preferably from 3:1 to 5.5:1. The transverse stretch ratio generally lies within the range from 3.0:1 to 5.0:1, preferably from 3.5:1 to 4.5:1. After the longitudinal orientation and prior to transverse orientation an in-line coating is applied on one or both surface(s) of the film as previously described. The in-line coating may lead to an improved adhesion of a metal layer or of a printing color which may be applied at a later time, but also to an improved anti-static behavior or processability.

For the production of a film with good sealing properties on the one hand and a comparably low haze on the other hand, a planar orientation $\Delta p$ of below $\Delta p=0.170$, preferably of below $\Delta p=0.168$ and especially preferred of below $\Delta p=0.166$ has proven advantageous. Thus, the modulus of the film in direction of the thickness is so high that, when determining the seal seam strength, it is guaranteed that the seal separates along the seam and the film does neither tear nor continue to tear. Moreover, this leads to a less pronounced forming of opacity-inducing vacuoles around the respective particles.

It was found that the essential parameters having influence on the planar orientation $\Delta p$ are both the process parameters of longitudinal orientation and of transverse orientation, as well as the SV-value of the raw material used. Process parameters are especially the stretch ratios in longitudinal and transverse direction ($\lambda_{MD}$ and $\lambda_{TD}$), the stretching temperatures in longitudinal and transverse direction ($T_{MD}$ and $T_{TD}$), the film line velocity and the kind of stretching, especially the one in machine direction. For example, if, on a particular film line, one obtains a planar orientation of $\Delta p=0.172$ with the set of parameters $\lambda_{MD}=4.8$ and $\lambda_{TD}=4.0$, the stretching temperatures in longitudinal and transverse direction $T_{MD}=80$ to $118°$ C. and $T_{TD}=80$ to $125°$ C., a planar orientation $\Delta p$ in the preferred range is obtained by increasing the longitudinal stretch temperature to $T_{MD}=80$ to $125°$ C. or by increasing the transverse stretching temperature to $T_{TD}=80$ to $135°$ C. or by reducing the length stretch ratio to $\lambda_{MD}=4.3$ or by reducing the transverse stretch ratio to $\lambda_{TD}=3.7$. In this case the film line velocity was 340 m/min and the SV-value of the material was about 730. The above data of the length stretch ratio are based on the so-called N-TEP stretching, consisting of a low orientation elongation (=LOE) and a rapid elongation process (=REP). Different stretching devices basically reveal the same proportions, the values of the individual process parameters, however, may vary slightly. The mentioned temperatures during the longitudinal stretching are based on the individual roller temperature, and during the transverse stretching on the film temperature measured by IR.

During the subsequent heat setting process the film is kept at a temperature of 150 to 250° C. for about 0.1 to 10 s. It is then wound up as known to those skilled in the art.

It is preferred to corona or flame treat one or both surface(s) of the film after biaxial orientation in accordance with methods known in the art. The intensity of the treatment is set such that the surface tension is 45 mN/m or higher.

In order to obtain further desired properties the film may additionally be coated. Typical coatings are those having adhesive, anti-static, slip-improving, or dehesive properties. It is advisable to apply these additional layers to the film via in-line coating by way of an aqueous dispersion prior to the transverse stretching step.

The single-sided mat, sealable film according to the invention has an outstanding sealability, appealing optical properties, very good handling characteristics and a very good processability. The sealable cover layer (A) of the film does not only seal against itself (fin sealing) but also against the mat cover layer (C) (lab sealing).

Additionally the film impresses by an attractive mat cover layer A without considerable deterioration (increase) of haze. Moreover, it is guaranteed that 10 to 60% by weight of the waste material resulting from film manufacture, based on the total weight of the film can be reused as regrind for the film production without noticeably effecting the physical properties of the film, especially the optical properties.

Thus the film is extremely well suitable for the production of flexible packaging material, especially in areas where its outstanding sealing properties and its good processability are needed. This is especially the case when used on high-speed packaging machines.

The following table (Table 1) summarizes the most important film characteristics.

TABLE 1

| | Range | | | | |
|---|---|---|---|---|---|
| | General | Preferred | Especially preferred | Unit | Measuring Method |
| COVER LAYER A | | | | | |
| Min. Seal. Temp. | <120 | <115 | <110 | ° C. | internal |
| Seal Seam Strength | >1.0 | >1.2 | >1.4 | N/15 mm | internal |
| Average Roughness $R_a$ | ≦100 | ≦90 | ≦80 | nm | DIN 4768, Cut-off of 0.25 mm |
| Measuring Range Surface Gas Flow Values | 20–4000 | 50–3500 | 60–3000 | sec | internal |
| Gloss, 60° | >100 | >110 | >120 | | DIN 67530 |
| COVER LAYER C | | | | | |
| Gloss, 60° | <100 | <90 | <80 | | DIN 67530 |
| Average Roughness $R_a$ | 150 to 1000 | 175 to 950 | 200 to 900 | nm | DIN 4768, Cut-off of 0.25 mm |
| Measuring Range Surface Gas Flow Values | ≦80 | 1–50 | 2–30 | sec | internal |
| COF | <0.6 | <0.45 | <0.40 | | DIN 53375 |

TABLE 1-continued

| | Range | | | | Measuring Method |
|---|---|---|---|---|---|
| | General | Preferred | Especially preferred | Unit | |
| Additional Film Characteristics | | | | | |
| Haze | <50 | <45 | <40 | % | ASTM-D 1003-52 internal |
| Planar Orientation Δp | <0.170 | <0.168 | <0.166 | | |

In order to characterize the raw materials and the films the following measuring methods were used in this invention:

SV-Value (Standard Viscosity)

The standard viscosity SV (DCE) is measured according to DIN 53726 in dichloro acetic acid. Intrinsic viscosity (IV) is determined as follows from the standard viscosity $$IV(DCE) = 6.907 \times 10^{-4} SV(DCE) + 0.063096.$$

Determination of the Minimum Sealing Temperature

By means of a sealing machine HSG/ET (Brugger) hot-sealed samples (seal seam 20 mm×100 mm) are produced with the film being sealed at different temperatures using two heated sealing shoes. Sample strips, each 15 mm wide, are then cut from the sealed probes. T-seal seam strength is measured in the same way as the seal seam strength. Minimum sealing temperature is the temperature at which a seal seam strength of at least 0.5 N/15 mm is obtained.

Seal Seam Strength

In order to determine the seal seam strength two film strips, each 15 mm wide, were arranged upon one another and sealed at a temperature of 130° C. for 0.5 s at a sealing pressure of 2 bar (machine: Brugger NDS, sealing shoe heated on one side). Seal seam strength was determined according to the T-Peel method.

Friction (COF)

Friction was determined in accordance with DIN 53 375. The coefficient of friction was measured 14 days after production.

Surface Tension

Surface tension was determined by means of the so-called ink method (DIN 53 364).

Haze

Haze, according to Hölz, was determined in accordance with ASTM-D 1003-52, but in order to optimally use the scanning range measurement was performed on four film layers arranged on top of one another and a 1°-slit orifice was used instead of a 4° hole orifice.

Gloss

Gloss was determined according to DIN 67 530. The reflection value as an optical parameter of the surface of the film was measured. Following standard ASTM-D 523-78 and ISO 2813 the light incident angle was set to 20° or 60°. A light beam hits the planar test surface at the pre-set angle of incidence and is reflected, respectively scattered. The light beams reaching the photo-electronic receivers are displayed as a proportional electrical unit. The parameter has no unit and must be stated together with the angle of incidence.

Surface Gas-Flow Time

The principal of the measuring method is based upon the air flow between one side of the film and a smooth silicon-wafer plate. Ambient air flows into a chamber under vacuum with the interface between film and silicon-wafer plate serving as a resistance to fluid flow.

A circular film sample is placed on a silicon-wafer plate in the middle of which a drill-hole serves as a connection to the recipient. Pressure within this recipient is reduced to less than 0.1 mbar. The time in seconds is measured which the ambient air needs to cause a pressure increase within the recipient of 56 mbar.

Measurement Conditions:

| | |
|---|---|
| measurement area | 45.1 cm² |
| pressing weight | 1276 g |
| air temperature | 23° C. |
| air moisture | 50% relative humidity |
| gas volume | 1.2 cm³ |
| pressure interval | 56 mbar |

Determination of Planar Orientation Δp

Planar orientation is determined via measurement of the refraction indices using the Abbe refractometer in accordance with an internal operating procedure.

Sample Preparation:

| | |
|---|---|
| sample size and length: | 60 to 100 mm |
| sample width: | corresponds to 10 mm prism width |

In order to determine $n_{MD}$ and $n_a$ (=$n_z$) the sample to be measured must be cut out of the film, the running edge of the sample must exactly match TD direction. In order to determine $n_{TD}$ and $n_a$ (=$n_z$) the sample to be measured must be cut out of the film, the running edge of the sample must exactly match MD direction. The samples must be taken from the middle of the film (width-wise). Care has to be taken that the Abbe refractometer has a temperature of 23° C. Using a glass rod a small quantity of $CH_2J_2$ (N=1.745) respectively a diiodine methane-bromine naphthalene mixture is applied to the lower prism, carefully cleaned prior to measurement. The refraction index of the mixture must be greater than 1.685. As a first step the sample, previously cut out in TD direction, is placed on top of this mixture in such a way that it covers the entire surface of the prism. With a paper towel the film is now ironed firmly and smoothly against the prism. The excess liquid has to be removed. A small quantity of measuring liquid is then placed onto the film. The second prism is flipped down and firmly pressed on. The indicator scale is moved until, upon reaching a range from 1.62 to 1.68, a transition from light to dark is observed in the indicator window. Should the transition from light to dark not be distinct the colors are merged in such a way that only a light zone and a dark zone are visible. The distinct boundary line is then moved to the crossing point of the two diagonal lines (in the ocular). The reading now displayed on the gauge is taken and entered into the record sheet. This is the refraction index in machine direction $n_{MD}$. The scale is now moved until the range from 1.49 to 1.50 is visible in the ocular. Now the refraction index in $n_a$ respectively $n_z$ (in the direction of thickness of the film) is determined. For a better vision of the barely visible transition area a polarization film is fixed to the ocular. This film must be rotated until the transition area is clearly visible. The same holds as for the determination of $n_{MD}$. If the transition from light to dark is not distinct the colors are merged until a distinct boundary is discernable. This distinct boundary line is moved to the crossing point of the two diagonal lines, the gauge reading is taken and entered into the table.

The sample is then rotated and the respective refraction indices $n_{MD}$ and $n_a$ (=$n_z$) of the reverse side of the surface are determined and entered into the respective table.

Following the determination of the refraction indices in machine direction respectively in the direction of thickness, the sample strip cut out in machine direction is applied and the refraction indices $n_{TD}$ and $n_a$ ($=n_z$) are determined accordingly. The strip is then reversed and the values for side B are measured. The values for side A and side B are calculated to result in average refraction indices. Orientation values are then calculated, based on the refraction indices according to the following formula:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

EXAMPLE 1

Polyethylene terephthalate chips (manufactured via the ester interchange process, with Mn used as ester interchange catalyst, Mn content: 100 ppm) were dried to a moisture of less than 100 ppm at a temperature of 150° C., and fed to the extruder of the base layer (B).

In addition to that, polyethylene terephthalate chips and a filler were fed to the extruder of mat cover layer (C).

Chips made of a linear polyester were also produced consisting of an amorphous copolyester (herein-after referred to as copolyester I) with 78 mol-% of ethylene terephthalate and 22 mol-% of ethylene isophthalate (manufactured via the ester interchange process, with Mn used as ester interchange catalyst, Mn content: 100 ppm). Copolyester I was dried to a moisture of less than 200 ppm at a temperature of 100° C., and fed to the extruder of sealable layer (A).

By coextrusion and subsequent stepwise orientation in both longitudinal and transverse direction a transparent, three-layered film with ABC-structure and a total thickness of 12 µm was produced. The thicknesses of the individual cover layers can be taken from Table 2.

| Cover layer (A), mixture of: | |
|---|---|
| 96.0% by weight of | copolyester I with a SV-value of 800 |
| 4.0% by weight of | master batch of 97.75% by weight of copolyester I and 1.0 % by weight of ®Sylobloc 44 H (synthetic SiO$_2$ of Grace) and 1.25% by weight of ®Aerosil TT 600 (pyrogene SiO$_2$ of Degussa) |
| Base layer (B): | |
| 100.0% by weight of | polyethylene terephthalate, SV-value 800 |
| Cover layer C, mixture of: | |
| 40% by weight of | polyethylene terephthalate, SV-value 800 |
| 60% by weight of | master batch of 95% by weight of polyethylene terephthalate and 5.0% by weight of silicic acid particles (®Sylobloc 44 H of Grace) with an average particle size of 4.5 µm. |

Conditions of the individual process steps during production were as follows:

| Extrusion: | temperatures | layer A: 270° C. |
|---|---|---|
| | | layer B: 290° C. |
| | | layer C: 290° C. |

| | | |
|---|---|---|
| | slot die width: | 2.5 mm |
| | temperature of take-off roller | 30° C. |
| longitudinal orientation: | temperature: | 80–126° C. |
| | longitudinal stretch ratio: | 4.0 |
| transverse orientation: | temperature: | 80–135° C. |
| | transverse stretch ratio: | 4.0 |
| setting: | temperature: | 230° C. |
| | duration: | 3 s |

The film had the desired low gloss, low haze and good sealing properties. In addition the film had the desired handling properties and the desired processability. Film structure and properties of films produced in this manner are shown in Tables 2 and 3.

EXAMPLE 2

Compared to Example 1 the thickness of the sealable cover layer (A) was increased from 1.5 µm 2.0 µm while film structure and way of production remained identical. Sealing properties could thus be improved, a significant increase especially in seal seam strength was noted.

EXAMPLE 3

Compared to Example 1 a film with a thickness of 23 µm was now produced. Thickness of the sealable cover layer (A) was 2.5 µm, the one of the non-sealable layer (C) was 2.0 µm. The gloss of the film was further reduced, sealing properties could again be improved and especially the seal seam strength could again be significantly increased. In addition, a tendency to an improved handling of the film was noticed.

EXAMPLE 4

Compared to Example 3 the copolymer for sealable layer (A) was altered. Instead of the amorphous copolymer with 78 mol-% of polyethylene terephthalate and 22 mol-% of ethylene isophthalate, an amorphous copolyester with 70 mol-% of polyethylene terephthalate and 30 mol-% of ethylene isophthalate was now used. The raw material was processed in a twin-screw-extruder with vacuum vent without the need of prior pre-drying. Thickness of the sealable cover layer (A) was again 2.5 µm and the one of the non-sealable layer (C) was 2.0 µm. Sealing properties were improved and especially the seal seam strength was significantly increased. In order to achieve better handling qualities and an improved processability of the film the amount of pigments within sealable cover layer (A) was slightly increased.

EXAMPLE 5

Compared to Example 3 the composition of mat cover layer (C) was altered. Instead of the polyethylene terephthalate with a SV-value of 800, 20% by weight of polymer component I (sulfocontaining compound) of the mat cover layer (C) were now added. Component I then consists of:

a) 90 mol-% of isophthalic acid,
b) 10 mol-% of Na-salt of the sulfoisophthalic acid By adding component I to the mat cover layer, opacity of the film and sealability of side (A) against side (C) was further improved.

Cover layer (C), mixture of:
20% by weight of polyethylene terephthalate with an SV-value of 800
20% by weight of component I
60% by weight of master batch made of 95% by weight of polyethylene terephthalate and 5.0% by weight of silicic acid (®Sylobloc 44 of Grace) with an average particle size of 4.5 μm.

COMPARATIVE EXAMPLE 1

Compared to Example 1 the sealable cover layer (A) did not contain particles. This slightly improved the sealing properties, it did, however, lead to an unacceptable deterioration of handling characteristics and work ability of the film.

COMPARATIVE EXAMPLE 2

Compared to Example 1 sealable cover layer (A) was now provided with the same amount of particles as in non-sealable cover layer (C). This led to an improvement in handling characteristics and work ability, sealing characteristics, however, significantly deteriorated.

COMPARATIVE EXAMPLE 3

Compared to Example 1 non-sealable cover layer (C) now contained significantly less particles. This led to a significant deterioration in handling properties and processability of the film.

COMPARATIVE EXAMPLE 4

Example 1 from EP-A-0 035 835 was repeated. The sealing properties, handling properties and processability are worse than in the Examples according to the invention.

TABLE 2

| Example | Film Thickness μm | Film Structure | Layer Thicknesses μm A | B | C | Pigments in Layers A | B | C | Average Diameter of Pigments in Layers μm A | B | C | Pigment Concentration ppm A | B | C |
|---|---|---|---|---|---|---|---|---|---|---|---|---|---|---|
| E 1 | 12 | ABC | 1.5 | 9 | 1.5 | Sylobloc 44H Aerosil TT600 | none | Sylobloc 44 | 2.5 0.04 | | 4.5 | 300 375 | 0 | 30000 |
| E 2 | 12 | ABC | 2.0 | 8.5 | 1.5 | Sylobloc 44H Aerosil TT600 | none | Sylobloc 44 | 2.5 0.04 | | 4.5 | 300 375 | 0 | 30000 |
| E 3 | 23 | ABC | 2.5 | 18.5 | 2.0 | Sylobloc 44H Aerosil TT600 | none | Sylobloc 44 | 2.5 0.04 | | 4.5 | 300 375 | 0 | 30000 |
| E 4 | 23 | ABC | 2.5 | 18.5 | 2.0 | Sylobloc 44H Aerosil TT600 | none | Sylobloc 44 | 2.5 0.04 | | 4.5 | 400 500 | 0 | 30000 |
| E 5 | 23 | ABC | 2.5 | 18.5 | 2.0 | Sylobloc 44H Aerosil TT600 | none | Sylobloc 44 | 2.5 0.04 | | 4.5 | 400 500 | 0 | 30000 |
| CE 1 | 12 | ABC | 1.5 | 9 | 1.5 | None | none | Sylobloc 44H Aerosil TT600 | | | 2.5 0.04 | | 0 | 1200 1500 |
| CE 2 | 12 | ABC | 1.5 | 9 | 1.5 | Sylobloc 44H Aerosil TT600 | none | Sylobloc 44H Aerosil TT600 | 2.5 0.04 | | 2.5 0.04 | 300 375 | 0 | 1200 1500 |
| CE 3 | 12 | ABC | 1.5 | 9 | 1.5 | Sylobloc 44H Aerosil TT600 | none | Sylobloc 44H Aerosil TT600 | 2.5 0.04 | | 2.5 0.04 | 300 375 | 0 | 600 750 |
| CE 4 | 15 | AB | 2.25 | 12.75 | | Gasil 35 | none | | 3 | | | 2500 | 0 | |

TABLE 3

| Example | Minimum Sealing Temperature °C Side A against Side A | Seal Seam Strength N/15 mm Side A against Side A | Seal Seam Strength N/15 mm Side A Against Side C | Friction (COF) Side C Against Side C | Average Roughness $R_a$ nm Side A | Average Roughness $R_a$ nm Side C | Surface Gas-Flow Values s Side A | Surface Gas-Flow Values s Side C | Δp | Gloss Side A | Gloss Side C | Haze | Winding Behavoir and Handling Properties | Processability |
|---|---|---|---|---|---|---|---|---|---|---|---|---|---|---|
| E 1 | 100 | 2.0 | 1.3 | 0.40 | 25 | 230 | 1200 | 10 | 0.165 | 140 | 55 | 45 | ++ | ++ |
| E 2 | 98 | 2.7 | 1.5 | 0.40 | 26 | 230 | 1280 | 10 | 0.165 | 140 | 55 | 45 | ++ | ++ |
| E 3 | 95 | 3.0 | 1.8 | 0.40 | 23 | 230 | 1110 | 10 | 0.165 | 130 | 50 | 47 | ++ | ++ |
| E 4 | 85 | 3.3 | 2.0 | 0.40 | 23 | 230 | 1300 | 10 | 0.165 | 130 | 50 | 47 | ++ | ++ |
| E 5 | 85 | 3.3 | 2.0 | 0.40 | 23 | 250 | 1300 | 8 | 0.165 | 130 | 45 | 35 | ++ | ++ |

TABLE 3-continued

| Example | Minimum Sealing Temperature °C. Side A against Side A | Seal Seam Strength N/15 mm Side A against Side A | Friction (COF) Side A Against Side C | Friction (COF) Side C Against Side C | Average Roughness $R_a$ nm Side A | Average Roughness $R_a$ nm Side C | Surface Gas-Flow Values s Side A | Surface Gas-Flow Values s Side C | Δp | Gloss Side A | Gloss Side C | Haze | Winding Behavior and Handling Properties | Processability |
|---|---|---|---|---|---|---|---|---|---|---|---|---|---|---|
| CE 1 | 98 | 2.1 | | 0.45 | 10 | 65 | 10000 | 80 | 0.165 | 160 | 170 | 1.5 | − | − |
| CE 2 | 110 | 1.0 | | 0.45 | 65 | 65 | 80 | 80 | 0.165 | 130 | 170 | 2.8 | − | − |
| CE 3 | 100 | 2.0 | | 0.45 | 25 | 37 | 1200 | 150 | 0.165 | 160 | 190 | 1.5 | − | − |
| CE 4 | 115 | 0.97 | | >2 | 70 | 20 | 50 | >5000 | | | | 12 | − | − |

Legend for the columns "Winding Behavior and Handling Properties" and "Processability":
++: no tendency to stick to rollers or other mechanical parts, no problems with blocking during winding and processing on packaging machines, low production costs
+: medium production costs
−: tendency to stick to rollers or other mechanical parts, blocking problems during winding and processing on packaging machines, high production costs due to costly handling of the film on the machines

What is claimed is:

1. One-sided mat, sealable, biaxially oriented and coextruded polyester film with at least a base layer B containing at least 80% by weight of a thermoplastic polyester, a sealable cover layer (A) and a mat cover layer (C), wherein
   a) the sealable cover layer (A) has a minimum sealing temperature of less than 120° C., a seal seam strength of at least 1.0 N/15 mm film width, a maximum $R_a$-value of 100 nm and a surface gas-flow within the range from 20 to 4000 s;
   b) the mat cover layer (C) has a maximum gloss of 100, a minimum $R_a$-value of 150 nm and a surface gas-flow value within the range from 0 to 80 s and
   c) the haze is below 50%.

2. Polyester film as claimed in claim 1, wherein the sealable cover layer (A) contains an amorphous copolyester, which is made of ethylene terephthalate, ethylene isophthalate and ethylene glycol units.

3. Polyester film as claimed in claim 2, wherein the amorphous copolyester of the sealable cover layer (A) contains an amount of 40 to 95 mol-% of ethylene terephthalate and an amount of 60 to 5 mol-% of ethylene isophthalate.

4. Polyester film as claimed in claim 1, wherein the sealable cover layer (A) has a thickness within the range from 0.2 to 3 μm.

5. Polyester film as claimed in claim 1, wherein the sealable cover layer contains an amount of 0.01 to 1% by weight of anti-blocking agents.

6. Polyester film as claimed in claim 1, wherein the sealable cover layer (A) has a coefficient of friction against itself of ≦1.0.

7. Polyester film as claimed in claim 1, wherein the cover layer (C) contains particles with an average diameter, expressed as $d_{50}$-value, of ≧1 μm, and in an amount within the range from 0.5 to 20% by weight, based on the weight of the cover layer (C).

8. Polyester film as claimed in claim 1, wherein the cover layer (C) contains, apart from polyethylene terephthalate homopolymer or polyethylene terephthalate copolymer, an additional polymeric component I, which consists of the condensation product of the following monomers, respectively the derivatives thereof, capable of forming polyesters:
   a) 40 to 99 mol-% of isophthalic acid;
   b) 0 to 60 mol-% of at least one aliphatic dicarboxilic acid with the formula $HOOC(CH_2)_nCOOH$, where n is within the range from 1 to 11;
   c) 1 to 15 mol-% of at least one sulfomonomer, containing an alkali metal sulfonate group attached to the aromatic portion of a dicarboxilic acid;
   d) the stoichiometric quantity of a copolymerizable aliphatic or cycloaliphatic glycol with 2 to 11 carbon atoms, required for the forming of 100 mol % of condensate; where the indicated percentages each being based on the total quantity of monomers which form component I.

9. Packaging material containing a polyester film according to claim 1.

10. Polyester film as claimed in claim 1, wherein the haze is between 35 and 50%.

11. Process for the production of a polyester film as claimed in claim 1, by way of coextrusion, wherein the polymers, respectively the polymer mixtures, corresponding to the individual layers of the film (A), (B) and (C), which already contain the optional additives are compressed and liquefied in an extruder, the melts are then simultaneously extruded through a flat film die, and the extruded, multi-layered melt is drawn off on one or more take-off rolls, where the melt then cools down and solidifies to a pre-film, the pre-film is then biaxially stretched, the biaxially stretched film is thermofixed and optionally corona or flame-treated on the surface layer earmarked for treatment, and wound up thereafter, wherein the longitudinal stretching is performed at a temperature within the range from 80 to 130° C., and the transverse stretching from 90 to 150° C., and wherein the longitudinal stretch ratio is within the range from 2.5:1 to 6:1, and the transverse stretch ratio is within the range from 3.0:1 to 5.0:1.

12. Process as claimed in claim 11, wherein, for the thermofixing, the film is kept at a temperature within the range from 150 to 250° C. over a time period of 0.1 to 10 s.

13. Process as claimed in claim 11, wherein one surface or both surfaces of the film is or are corona- or flame-treated after the thermofixing, where the intensity of the treatment is set such that the resulting tension of the treated surface is ≧45 mN/m.

14. Process as claimed in claim 11, wherein an amount within the range from 10 to 60% by weight of waste material of the film production, based on the total weight of the film, is re-used as recycled material for the extrusion.

* * * * *